United States Patent [19]

Pentecost

[11] Patent Number: 4,630,376
[45] Date of Patent: Dec. 23, 1986

[54] MARKING DEVICE FOR TAPE MEASURE
[76] Inventor: Randal L. Pentecost, P.O. Box 2882, Flagstaff, Ariz. 86003
[21] Appl. No.: 727,734
[22] Filed: Apr. 26, 1985
[51] Int. Cl.⁴ ............................................. G01B 3/10
[52] U.S. Cl. ........................................ 33/138; 33/189
[58] Field of Search .............. 33/138, 189, 139, 27 C

[56] References Cited
U.S. PATENT DOCUMENTS

| | | | |
|---|---|---|---|
| 3,262,211 | 7/1966 | Beckett | 33/138 X |
| 3,577,641 | 5/1971 | Smith | 33/138 X |
| 3,802,083 | 4/1974 | Freed | 33/138 |
| 3,885,314 | 5/1975 | Banas | 33/138 X |
| 4,015,337 | 4/1977 | Taylor | 33/138 |
| 4,439,927 | 4/1984 | Elliott | 33/138 X |
| 4,542,589 | 9/1985 | Yamamoto | 33/138 |

Primary Examiner—William D. Martin, Jr.
Attorney, Agent, or Firm—Drummond & Nissle

[57] ABSTRACT

An inscriptive device for a tape measure. The inscriptive device is internally mounted on the tape measure and allows the user of the measure to form a mark on the surface of a workpiece at a point immediately beneath the tape measure.

1 Claim, 9 Drawing Figures

U.S. Patent  Dec. 23, 1986  4,630,376
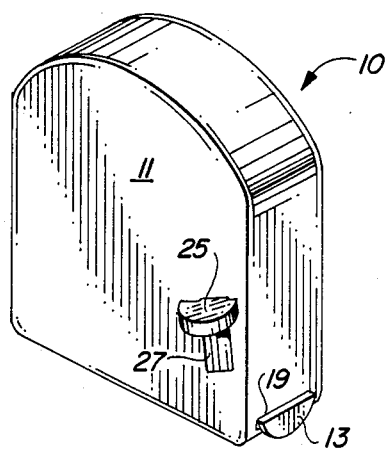
FIG-1
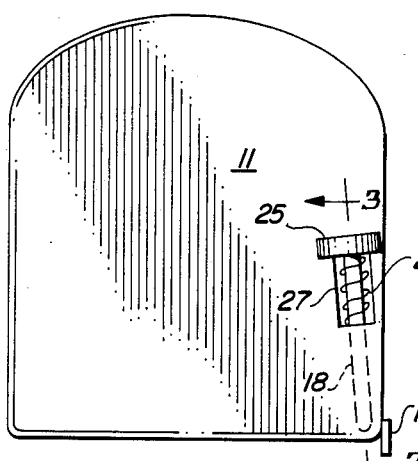
FIG-2A
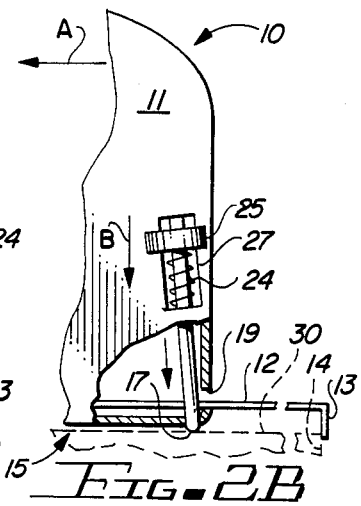
FIG-2B
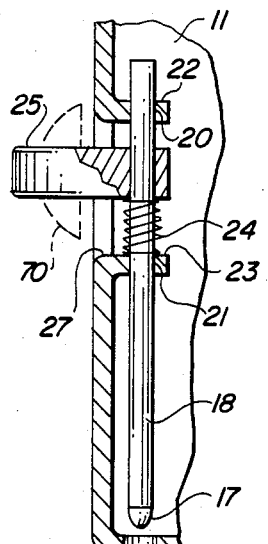
FIG-3
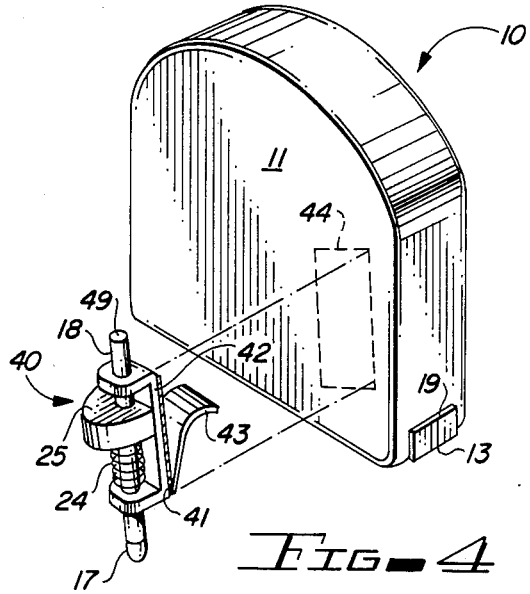
FIG-4
FIG-7
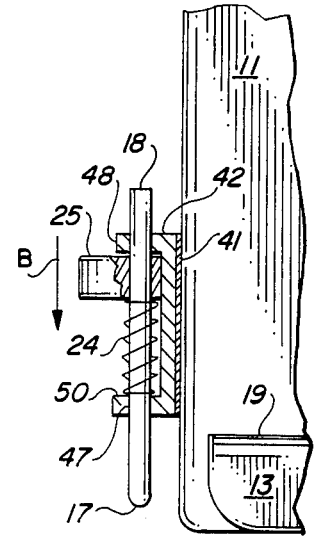
FIG-5
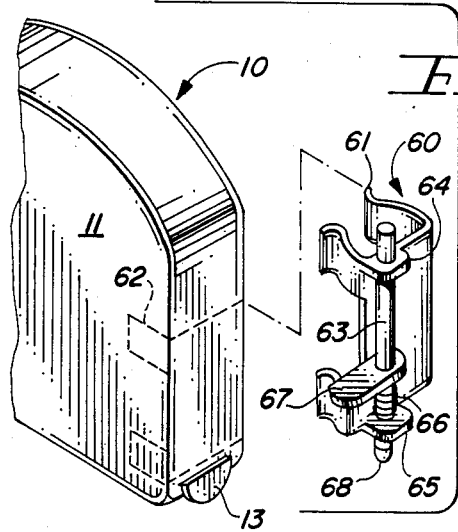
FIG-6
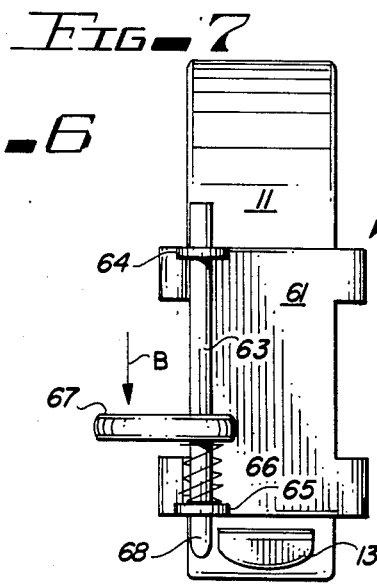
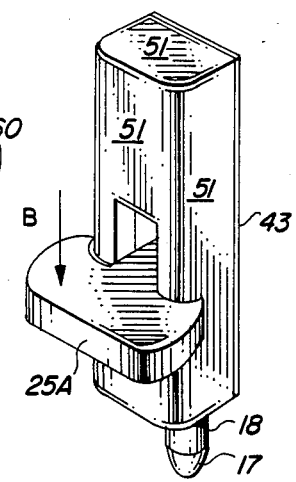
FIG-8

MARKING DEVICE FOR TAPE MEASURE

This invention relates to measuring instruments.

More particularly, the invention relates to a tape measure including an inscriptive device which permits a carpenter to manipulate the tape measure with one hand to simultaneously make measurements and markings on the surface of a workpiece.

In another respect, the invention relates to an inscriptive device which is integrated with a conventional tape measure without altering the exterior shape and dimension of the tape measure.

In a further respect, the invention relates to a tape measure inscriptive device which can be utilized to mark the surface of a workpiece at a point immediately beneath the tape measure.

A conventional tape measure includes a housing, a coiled ruled tape normally stored in the housing, and a mouth formed in the housing to permit the tape to be extended therefrom. One end of the ruled tape is always positioned outside the housing and includes a lip which engages the edge of a workpiece while the housing is held in one hand and laterally displaced to extend the tape from the housing. After the housing is displaced the desired distance along a workpiece by a carpenter, the carpenter continues to hold the tape measure in one hand while using his other hand to mark the surface of the workpiece with a pencil or other marker.

It would be advantageous if a carpenter could extend ruled tape from a tape measure and mark the surface of a workpiece without having to maintain a separate pencil or marker to be used in conjunction with the tape measure. To this end, a variety of inscriptive devices have been developed to be attached to and utilized in conjunction with conventional tape measures. See, for example, U.S. Pat. Nos. 3,262,211 to Beckett, 3,336,678 to Chamberlain et al, 3,802,083 to Freed and 4,296,554 to Hammerstrom. Such prior art devices have several disadvantages. In particular, the devices are attached to the exterior of the housing of a conventional tape measure and make utilization of the tape measure awkward and cumbersome. Further, after prior art inscriptive devices are attached to a tape measure, the tape measure cannot be stored in its normal pouch in a carpenter's apron. Finally, when a tape measure is being utilized, preferred practice is to mark the surface of a workpiece at a point immediately beneath and adjacent the mouth of the tape measure. Prior art tape measure inscriptive devices of the type noted above mark a workpiece at a point forwardly or laterally of the mouth of the tape measure.

Accordingly, it would be highly desirable to provide an improved tape measure inscriptive unit which could be readily integrated with a conventional tape measure, would generally not alter the exterior shape and dimension of the tape measure, and would enable a carpenter to manipulate the tape measure with a single hand to measure and mark a workpiece surface at a point immediately beneath the mouth of the tape measure and beneath the tape extending from the mouth of the tape measure.

Therefore, it is a principal object of the invention to provide an improved tape measure.

Another object of the invention is to provide an improved tape measure of the type including a housing, a ruled tape coiled in the housing, and a mouth formed in the housing to permit the tape to be extended from the housing.

A further object of the invention is to provide an inscriptive unit which can be integrated with a tape measure of the type described without altering the exterior shape and dimension of the tape measure.

Still another object of the instant invention is to provide an improved tape measure inscriptive unit which permits a tape measure to be utilized with a single hand to measure a workpiece and mark the surface of the workpiece at a point immediately beneath the mouth of the tape measure housing.

These and other, further and more specific objects and advantages of the invention will be apparent to those skilled in the art from the following detailed description thereof, taken in conjunction with the drawings, in which:

FIG. 1 is a perspective view of a tape measure including an inscriptive device constructed in accordance with the principles of the invention;

FIG. 2A is a side view of the tape measure and inscriptive device of FIG. 1 further illustrating construction details thereof;

FIG. 3 is a partial side view of the tape measure of FIG. 2B further illustrating the inscriptive device thereof;

FIG. 4 is a perspective view of a tape measure inscriptive device constructed in accordance with an alternate embodiment of the invention;

FIG. 5 is a partial side view of the tape measure and inscriptive device of FIG. 4;

FIG. 6 is a perspective assembly view of yet another embodiment of the tape measure inscriptive device of the invention;

FIG. 7 is a front elevation view of the tape measure of FIG. 7 with the inscriptive device thereof secured in position thereon; and, FIG. 8 is a perspective view of yet another embodiment of the tape measure inscriptive device of the invention.

Briefly, in accordance with my invention, I provide an improved measuring device. The device includes a coiled measuring tape; a housing for the tape, the housing including an upper portion and a lower portion, the lower portion having a mouth through which the measuring tape is extended from within the housing and an aperture formed therethrough; and, an inscriptive unit mounted on the housing and having a point for forming a mark on the surface of a workpiece. The point is movable between at least two operative positions, a first normal operative position with the point positioned inside the housing, and a second operative position with the point displaced through the aperture outside the housing and beneath the mouth thereof.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1–3 illustrate the presently preferred embodiment and best mode of the invention, including a tape measure generally indicated by reference character 10 and having a housing 11 enclosing a coiled ruled measuring tape 12. One end of tape 12 is provided with lip 13 which is utilized to engage the edge 14 of a workpiece 15 in the manner illustrated in FIG. 2B. Tape 12 is pulled outwardly through mouth 19 in conventional fashion. Aperture 16 in the bottom portion of housing 11 is sized to permit inscriptive tip 17 to pass therethrough. Tip 17 is attached to cylindrical elongate member 18 slidably mounted in apertures 20, 21 of arms 22, 23, respectively. Spring 24 is positioned intermediate arm 23 and thumb rest 25 fixedly secured to cylindrical elongate member 18. Thumb rest 25 extends outwardly from housing 11 through aperture 27 formed therein. Thumb rest 25 elongate member 18, spring 24 and inscriptive tip 17 are pictured in their first normal operative position in FIG. 3. In FIG. 3, inscriptive tip 17 is positioned inside housing 11. Compressed spring 24 expands against thumb rest 25 and arm 23 maintain inscriptive tip 17 in position inside housing 11.

In use of the tape measure of FIGS. 1 to 3, a carpenter grasps the tape measure in one hand and places lip 13 over the edge 14 of a workpiece 15 in the manner shown in FIG. 2B. The carpenter then, while continuing to grasp tape measure 10, displaces the measure away from edge 14 in the direction of arrow A. After the measure has been displaced away from edge 14 the desired distance, the carpenter places a thumb or finger of the hand grasping measure 10 on thumb rest 25 and downwardly depress thumb rest 25 in the direction of arrow B until inscriptive tip 17 contacts surface 30 of workpiece 15. When tip 17 contacts surface 30 a mark is made on surface 30. If necessary, the carpenter can, while tip 17 contacts surface 30, form a larger mark on surface 30 by using his hand to slightly move housing 11 from side to side, i.e., in FIG. 2B to move housing 11 from side to side in directions generally perpendicular to the plane of the sheet of paper of the drawings.

An alternate embodiment of the invention is illustrated in FIGS. 4 and 5 and includes tape measure 10 provided with inscriptive unit 40. Adhesive layer 41 on the back of U-shaped member 42 of unit 40 is exposed by removing protective peel-off sheet 43. Unit 40 is secured to housing 11 by pressing adhesive layer 41 against unit 11 in the position indicated by dashed lines 44 in FIG. 4. Elongate member 18 is slidably secured in apertures 47, 48 of U-shaped support member 42 of unit 40. Compressed spring 24 expands against thumb rest 25 and wall 50 to maintain tip 17 in its first normal operative position illustrated in FIG. 5. The tape measure of FIGS. 4 and 5 is utilized in a manner similar to that described for the tape measure of FIGS. 1–3. When lip 13 is positioned over the edge 14 of a workpiece 15 and the tape measure housing 11 is displaced a desired distance away from edge 14, a carpenter marks the surface of the workpiece by using the thumb or a finger of the hand holding housing 11 to depress thumb rest 25 in the direction of arrow B to force tip 17 against surface 30 of workpiece 15.

The inscriptive unit of FIG. 8 is generally identical to that of FIGS. 4 and 5 excepting that U-shaped member 42 is provided with exterior walls 51 which enclose spring 24, the upper portion of member 18, and member 42.

Still another embodiment of the invention is illustrated in FIGS. 6 and 7 and includes conventional tape measure 10 provided with a clip-on inscriptive unit 60. Unit 60 includes U-shaped clip 61 shaped and dimensioned to be received by housing 11 at the points generally indicated by dashed line 62 in FIG. 6. Cylindrical member 63 is slidably received by apertures formed in arms 64 and 65 connected to clip 61. Spring 66 between thumb rest 67 and arm 65 maintains inscriptive point 68 in the first normal operative position illustrated in FIG.

7. The tape measure of FIGS. 6 and 7 is generally utilized in the same manner earlier described for the tape measure of FIGS. 1–3. After lip 13 has been placed over the edge 14 of a workpiece 15 and housing 11 displaced the desired distance over workpiece 15 in a direction away from edge 14, the thumb or a finger of the hand grasping housing 11 is utilized to depress thumb rest 67 to force inscriptive point 68 against surface 30 of the workpiece.

The inscriptive unit or cartridge of FIG. 8 can be shaped and dimensioned to be internally mounted in housing 11 of tape measure 10. To facilitate the positioning of the cartridge of FIG. 8 inside housing 11, housing 11 can be provided with die cut snap-out portions. For example, in FIGS. 1–3 apertures 27 and 16 can be formed by snapping out inscribed die cut portions (not shown) of the walls of housing 11 and can be sized so that the cartridge of FIG. 8 is inserted through aperture 16 or 27 into housing 11. When the cartridge of FIG. 8 is positioned in housing 11, walls 51 are located inside housing 11 in the area generally occupied by shaft 18 and by members 22, 23 in FIG. 3, and, thumb rest 25A extends outwardly through aperture 27 in the manner of thumb rest 25 in FIG. 3. After the cartridge of FIG. 8 is inserted in housing 11, the cartridge is fixedly secured in position therein by snaps or other affixing means.

Thumb rest 25 can be replaced by a screw head, indicated in FIG. 3 by dashed line 70, or by other thumb rest means which do not extend outwardly away from housing 11 as far as thumb rest 25.

Tip 17 can be detachably fixedly secured to shaft 18 such that tip 17 can be readily removed and replaced with a new inscribing tip 17. Shaft 18 can be detachably secured to thumb rest 25 such that shaft 18 and tip 17 can be removed and replaced with a new shaft 18 and tip 17.

In use of the embodiment of the invention shown in FIG. 4, after tip 17 is worn, unit 40 can be removed from housing 11 and replaced with a new unit 40. When the cartridge of FIG. 8 is inserted inside housing 11 in the manner earlier described, the cartridge can be attached to housing 11 so the cartridge can be readily removed from housing 11 and replaced with a new cartridge.

Having described my invention in such terms as to enable those skilled in the art to understand and practice it, and having identified the presently preferred embodiments thereof, I claim:

1. A measuring device including
   (a) a graduated measuring tape coiled about a transverse axis;
   (b) a housing for said tape, said housing including:
      (i) a pair of opposed, spaced apart side walls bouding said coiled tape, said side walls having upper and lower portions,
      (ii) a front wall spanning the space between and interconnecting said side walls, said front wall having an upper and a lower portion,
      (iii) a top portion including said upper portions of said front and side walls,
      (iv) a bottom portion including said lower portions of said front and side walls,
      (v) a mouth formed through said lower portion of said front wall, said measuring tape being extended through said mouth from within said housing, and
      (vi) an aperture formed in said bottom portion generally adjacent said mouth; and, (c) an inscription unit mounted inside said housing adjacent said front wall and having
  (i) an elongate member with a point for forming a mark on the surface of a workpiece,
  (ii) thumb rest means extending through and outwardly from one of said side walls and operatively associated with said elongate member to move said elongate member between at least two operative positions,
    a first normal operative position with said pointd positioned inside said housing behind said front wall, and
    a second operative position with said point displaced downwardly from said first operative position through said aperture to a position generally directly beneath said front wall and mouth thereof, said thumb rest means being positioned on said side wall such that an individual can pick up said housing in one hand, extend said tape from said housing to make a measurement on a workpiece, and utilize a digit of the hand to operate said thumb rest means to make a mark on the workpiece at a point directly beneath said mouth of said tape meausre, said elongate member being canted from the vertical such that displacement of said point from said first to said second operative position forwardly displaces said point from within said housing and from behind said front wall to a position outside said housing and generally directly beneath said front wall and said mouth.

* * * * *